United States Patent [19]

Ebrecht

[11] 3,845,385

[45] Oct. 29, 1974

[54] CIRCUIT ARRANGEMENT FOR CONVERTING A BRIDGE UNBALANCE INTO A FREQUENCY VARIATION

[75] Inventor: Dietrich Meyer Ebrecht, Hamburg, Germany

[73] Assignee: U.S. Philips Corporation, New York, N.Y.

[22] Filed: Mar. 16, 1973

[21] Appl. No.: 341,985

[30] Foreign Application Priority Data

Mar. 23, 1972 Germany............................ 2214114

[52] U.S. Cl.............. 324/65 R, 324/DIG. 1, 331/65
[51] Int. Cl.............................................. G01r 27/02
[58] Field of Search............... 324/65 R, 62, DIG. 1; 318/663, 666, 667; 331/65

[56] References Cited

UNITED STATES PATENTS

| | | | |
|---|---|---|---|
| 2,988,709 | 6/1961 | Janssen | 324/65 R X |
| 3,392,348 | 7/1968 | Horwitz | 324/65 R X |
| 3,536,997 | 10/1970 | Holt | 324/62 |
| 3,588,690 | 6/1971 | Griffin | 324/62 X |

*Primary Examiner*—Stanley T. Krawczewicz
*Attorney, Agent, or Firm*—Frank R. Trifari; Bernard Franzblau

[57] ABSTRACT

The unbalance of a measuring bridge is measured by means of a frequency variation or period variation of an oscillator. The measuring bridge may, for example, be a four-arm strain-gage bridge. In order to assure a linear conversion of the unbalance, which represents the quantity to be measured, into a frequency or period variation two control loops are required. One loop injects an unbalance compensation current into the bridge via a null balancing system. The variations in the latter system cause a variation of the frequency of an oscillator via, for example, the resistance variation of a photo-sensitive resistor. The second loop ensures that a second equivalent impedance in the frequency-determining network influences the oscillator in the same way, so that the square root of the two impedances yields the linear relationship. The invention indicates how by the choice of the oscillator the control loops can be simplified, for example, by using multiplier circuits as variable potentiometers, and how in a simple manner either a frequency variation or a period variation can be obtained as a measuring result.

12 Claims, 2 Drawing Figures

CIRCUIT ARRANGEMENT FOR CONVERTING A BRIDGE UNBALANCE INTO A FREQUENCY VARIATION

Figure 1:
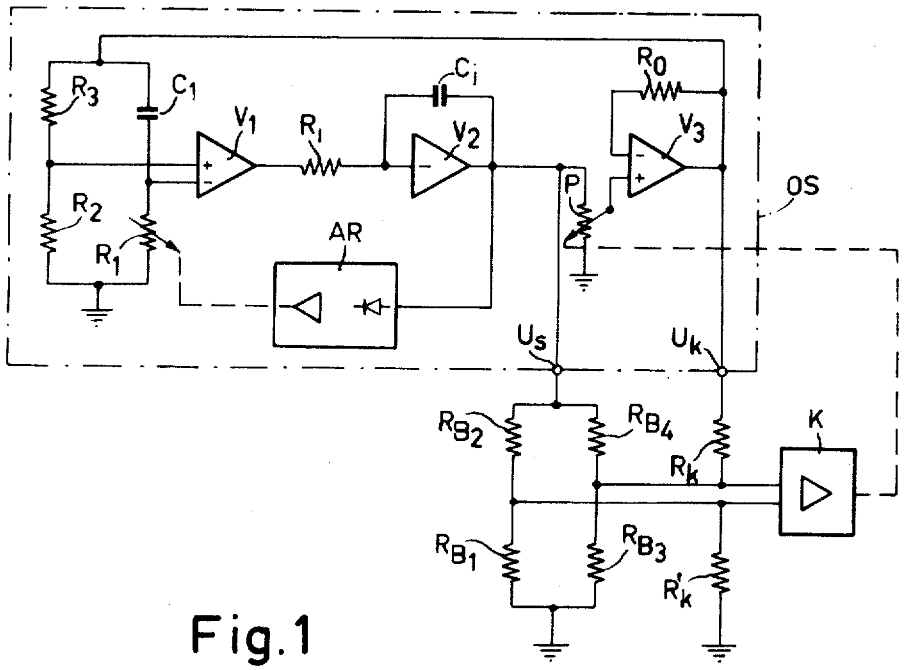

The invention relates to a circuit arrangement for converting an unbalance of a resistance bridge comprising four resistors into a proportional variation of the frequency or period of the oscillation signal of an oscillator. The bridge output terminals are connected to a compensation amplifier which controls a unit with variable gain, the bridge furthermore being connected to a supply source. At least one of the bridge output terminals is connected through a resistor to the unit with variable gain in order to supply a compensation voltage for the bridge unbalance, while the unit with variable gain forms part of the frequency-determining network of the oscillator.

Such a circuit arrangement is known from U.S. Pat. No. 3,614,598 and is described in an article by D. Meyer, "Praezisions-ΔR-Δf-Umformer fuer frequenzanaloges Messen mit DMS," V.D.I.-Berichte 137, pages 41–44. In this circuit arrangement the variable resistors of the measurement-value transducer are included as a bridge circuit in a control loop which, by detuning an oscillator, compensates for the bridge unbalance. As a result, the frequency of the oscillator is linear with the bridge unbalance and is otherwise insensitive to parasitic reactive components of the measurement-value transducer. However, a drawback of that arrangement is that the control loops thereof require resistors which can be controlled electronically and in a potential-free manner and which exhibit a linear voltage/current characteristic. Rsistors which are technically realizable today are either slow, such as, for example, photo-resistors, so that only comparatively slow variations of the measurement value are accurately reproduced, or non-linear, such as for example field-effect transistors, which leads to non-linearity of the control chracteristic and an insufficiently constant frequency.

However, the principle described in the preamble may also be used in different oscillator circuits. Harmonic oscillators, however, always require an additional control loop for amplitude stabilization, so that the arrangement in any case comprises two control loops.

It is an object of the invention to provide an oscillator circuit in which these control loops are of a simple design. According to the invention this is achieved in that the oscillator consists of a closed loop comprising, in this order, an all-pass network including a series connection of a variable resistor and a reactance providing a 90° phase shift and a first amplifier, furthermore an integrator and the unit with variable gain. To the output of the integrator an amplitude detector is connected which compares the integrator signal to a reference and which supplies a control signal to the variable resistor to maintain the amplitude of said integrator signal constant, and that the supply source derives its voltage from the oscillator signal in the closed loop.

Such an oscillator has the advantage that the variable resistors can be formed by electronic multiplier circuits, for example, by an integrated semiconductor circuit of the type described in the article by B. Gilbert "A precise four-quadrant multiplier with subnanosecond response," I.E.E.E. J. S.S.C., September 1968, pages 365 - 373.

Figure 2:
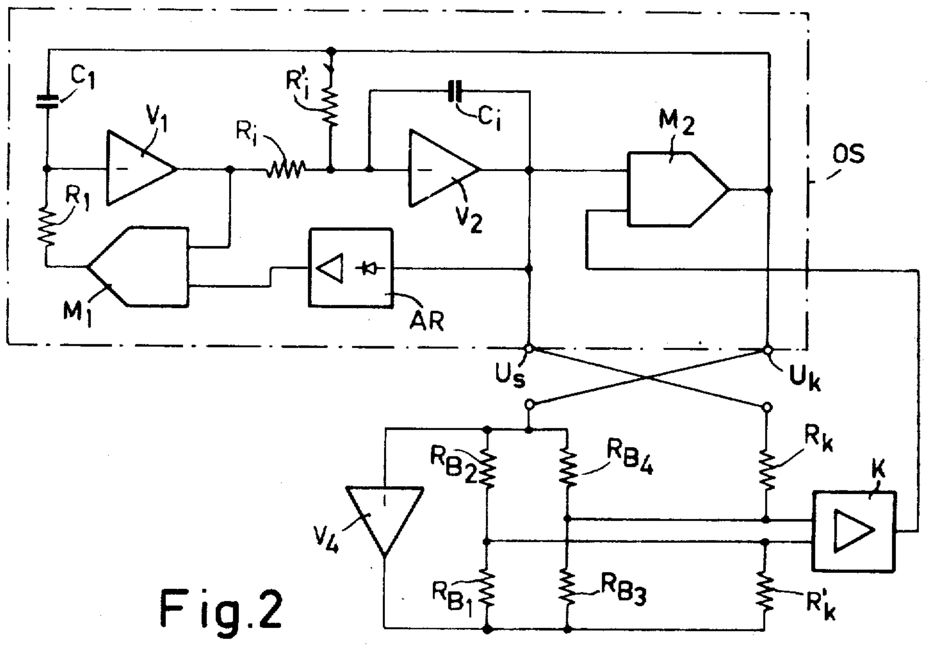

The invention will now be described in further detail, by way of example, with reference to the accompanying drawing, in which:

FIG. 1 is a schematic circuit diagram of an oscillator according to the invention, and FIG. 2 illustrates the replacement of the variable resistors by multiplier circuits.

The measurement value transducer in FIG. 1 together with other resistors forms a resistance bridge $R_{B1} \ldots R_{B4}$, which receives the supply voltage $U_s$ which is produced by the oscillator OS, to be described hereinafter. The output of the bridge circuit is connected to a compensation amplifier K, which so varies a variable resistor P, here formed by a potentiometer, which is connected to the bridge supply voltage $U_s$ so that the voltage $U_k$ at the output of the operational amplifier $V_3$, which is connected to the variable resistor, restores the bridge balance via the resistor. This resistor $R_k$ is connected to one output of the resistance bridge, at whose other output a resistor $R_k'$ is connected to ground in order to ensure a symmetrical and linear compensation. Consequently, the ratio between the voltages $U_k$ and $U_s$ is in a linear relationship with the unbalance of the resistance bridge consisting of the resistors $R_{B1} \ldots R_{B4}$ and this ratio is designated $k$ hereinafter.

The output of the operational amplifier $V_3$, to which negative feedback is applied in a known manner, moreover feeds an all-pass network which consists of resistors $R_1$, $R_2$, $R_3$ and the capacitor $C_1$ and which is also in the form of a bridge. The outputs of the all-pass network are connected to the inputs of a difference amplifier $V_1$, which feeds an integrator. This integrator consists of the high-gain inverter amplifier $V_2$, an integration capacitor $C_i$ which shunts said amplifier and an ohmic series resistor $R_i$. The output of the integrator is connected to an amplitude detector AR, which varies the grounded variable resistor $R_1$ in the all-pass network in such a way that the amplitude of the voltage at the output of the integrator is always constant. The output voltage of the integrator is also the supply voltage $U_s$ of the bridge.

Thus, a circuit is obtained which can oscillate and whose angular frequency $\omega_o$ is adjusted in accordance with the equation given below, when the two resistors $R_2$ and $R_3$ of the all-pass network are made equal:

$$\omega_o = k \cdot (V_1/2R_i\, C_i)$$

In this equation $V_1$ is the gain of the difference amplifier $V_1$ and $k$, as already stated, is the ratio of the voltages $U_k/U_s$. Thus, $\omega_o$ can be linearly varied by $k$. As on the other hand $k$ varies linearly with the bridge unbalance $\Delta R_B$, the angular frequency $\omega_o$ of the oscillator is linearly related to the bridge unbalance:

$$\omega_o = [(R_k \cdot V_1)/(R_B R_i C_i)] \cdot (\Delta R_B/R_B)$$

Thus, the choice of a suitable value for $R_k/R_B$ enables a very small bridge unbalance to result in a substantial frequency variation.

The variable resistors in the two control loops may be formed by electronic multiplier circuits, as is shown in FIG. 2. This becomes readily evident when considering the variable resistor P in the oscillator circuit OS shown in FIG. 1, which in this case is formed by a potentiometer. The output signal of the comparator K here determines which fraction of the bridge supply voltage $U_s$ is to be applied to the operational amplifier $V_3$, i.e., it defines the factor $k$.

An electronic multiplier circuit supplies an output signal which is the product of the two signals appearing at its two inputs. When one input receives a direct voltage, the magnitude of this direct voltage indicates which fraction of the signal occurring at the other input will appear at the output of the multiplier circuit. In FIG. 2 the multiplier circuit $M_2$ is therefore arranged so that one input is connected to the output of the compensation amplifier K and the other input to the supply voltage source of the bridge. The multiplier circuit $M_2$ may now readily perform the function of the operational amplifier $V_3$ shown in FIG. 1 so that its output directly supplies the compensation voltage $U_k$.

Instead of the variable resistor $R_1$ a fixed resistor $R_1'$ is included in the all-pass network, whose base point is not connected to ground, but to the output of a further multiplier circuit $M_1$. One input of this multiplier circuit is connected to the output of the amplifier $V_1$, while to the other input the amplitude detector $A_r$ applies a d.c. control voltage, designated $u_r$, which determines which fraction of the output voltage of amplifier $V_1$ will appear at the output voltage of amplifier $V_1$ will appear at the output of the multiplier circuit $M_1$. The resistance $R_1$ which is active for the all-pass network is then:

$$R_1 = R_1'/(1 + m \cdot V_1 \cdot U_r),$$

where $m$ is a constant of the multiplier circuit.

The resistive branch $R_2$, $R_3$ of the all-pass network and the consequent difference formation required in the amplifier $V_1$ are then no longer necessary, so that the amplifier $V_1$ need only be a simple inverting amplifier when the output voltage of the multiplier circuit $M_2$ is also applied to the integrator via a second integrator input resistor $$R_i' = R_i \cdot (2/V_1)$$

Furthermore, the connections of the resistance bridge $R_{B1} \ldots R_{B4}$ and those of the compensation resistor $R_k$ with the oscillator OS are interchanged in FIG. 2, so that the compensation resistor $R_k$ is connected to the bridge supply voltage $U_s$ and the resistance bridge to the compensation voltage $U_k$. As a result, the angular frequency $\omega_o$ of the oscillator is no longer proportional to $k$, but to $1/k$, so that now the period becomes proportional to the bridge unbalance, which can be favourable for the measurement value processing.

Finally, the base points of the resistance bridge and of the compensation resistor $R_k'$ in FIG. 2 are not connected to ground, but to the upper supply point of the bridge via an inverting amplifier. As a result, the base point of the bridge is driven in phase opposition to the supply point so that the sensitivity of the device is increased.

What is claimed is:

1. A circuit for converting a resistance variation into a proportional variation of the oscillation frequency of an oscillator comprising, a resistance bridge having input terminals supplied by the oscillation signal of the oscillator, said oscillator including a frequency determining network that includes a variable gain device, a compensation amplifier with its input connected to the bridge output terminals and its output connected to control the variable gain device, a resistor coupling the variable gain device to an output terminal of said bridge to supply a compensation signal for any bridge unbalance so that the ratio of the compensation signal to the oscillation signal is in a linear relationship to the bridge unbalance, said oscillator further comprising, a variable resistor and a reactance element in series circuit, an amplifier with its input coupled to the reactance element and its output connected to the input of an integrator, means connecting the integrator output to the input of the variable gain device and the output of the variable gain device to said series circuit, and means responsive to the integrator output signal for varying said variable resistor in a manner to maintain the amplitude of the integrator signal constant.

2. A circuit as claimed in claim 1 wherein the oscillation signal for said resistance bridge is derived at the output of said integrator and the compensation signal is developed at the output of said variable gain device.

3. A circuit as claimed in claim 1 wherein said series circuit comprises one branch of a second bridge circuit, the second branch of said second bridge circuit comprising first and second series connected resistors, and wherein the output of the variable gain device is coupled to the second bridge input terminals and the amplifier input is coupled to the second bridge output terminals.

4. A circuit as claimed in claim 1 wherein said variable gain device comprises a multiplier circuit having first and second inputs connected to the output of the integrator and to the output of the compensation amplifier, respectively, and an output connected to said series circuit.

5. A measuring circuit comprising, an oscillator, a compensation amplifier, a resistance bridge comprising four resistors, means connecting the bridge output terminals to the compensation amplifier which in turn controls a variable gain device, means connecting at least one of the bridge output terminals through a resistor to the variable gain device in order to supply a compensation voltage for the bridge unbalance, means connecting the variable gain device as a part of the frequency-determining network of the oscillator, said oscillator including a closed loop comprising, in this order, an all-pass network including a series connection of a variable resistor and a reactance element and a first amplifier, an integrator connected between the first amplifier and the variable gain device, means connecting an amplitude detector to the integrator output, said detector comparing the integrator signal to a reference quantity to derive a control signal, means for coupling the control signal to the variable resistor so as to maintain the amplitude of said integrator signal constant, and means for coupling the oscillator signal to the input terminals of the resistance bridge.

6. A circuit as claimed in claim 5 wherein to convert the bridge unbalance into a frequency variation of the oscillator signal the circuit includes means connecting the bridge to the output of the integrator, and said one of the output terminals of the resistance bridge is connected to the output of the variable gain device through said resistor.

7. A circuit as claimed in claim 5, characterized in that for the conversion of the bridge unbalance into a variation of the period of the oscillator signal the bridge is connected to the output of the variable gain device and said one of the output terminals of the resistance bridge is connected to the output of the integrator through said resistor.

8. A circuit as claimed in claim 5 wherein said variable gain device comprises, a voltage dividing network controlled by the compensation amplifier and connected to the output of the integrator, and an amplifier with constant gain factor having an input connected to a voltage division tap of the voltage dividing network and an output connected to the all-pass filter.

9. A circuit as claimed in claim 5 wherein said variable gain device comprises, a first multiplier circuit having one input connected to the output of the integrator and a second input connected to the output of the compensation amplifier, and means connecting the output of the multiplier circuit to the all-pass network.

10. A circuit as claimed in claim 5 wherein the all-pass filter network comprises, a second bridge circuit having a pair of input terminals which forms the input of the filter, one branch of the bridge circuit between the input terminals includes two equal resistors and the other branch comprises said reactance element and the variable resistor, and the first amplifier comprises a differential amplifier having input terminals connected to the output terminals of the second bridge circuit and an output connected to the integrator input, and said reactance element includes a capacitor.

11. A circuit as claimed in claim 5 wherein the all-pass filter network, the first amplifier and the integrator comprise, means connecting a capacitor reactance element to the input of the filter and to the variable resistor and to the input of the first amplifier which has a gain factor $-V_1$, means connecting the output of the first amplifier via a first integrating resistor of the value $R_i$ to one input of an operational amplifier, whose other input is connected to ground and whose output is the output of the integrator, means connecting the input of the filter to the one input of the operational amplifier by means of a second integrating resistor of the value $2\ R_i/V_1$, and an integrating capacitor connected between said one input and the output of the operational amplifier.

12. A circuit as claimed in claim 11, characterized in that the variable resistor comprises a resistor of constant value, one end of which is connected to the input of the first amplifier and the other end to the output of a multiplier stage having two inputs, means connecting one multiplier input to the output of the first amplifier and the other input to the output of the amplitude detector.

* * * * *

PO-1050
(5/69)

UNITED STATES PATENT OFFICE
CERTIFICATE OF CORRECTION

Patent No. 3,845,385 Dated October 29, 1974

Inventor(s) DIETRICH MEYER EBRECHT

It is certified that error appears in the above-identified patent and that said Letters Patent are hereby corrected as shown below:

IN THE TITLE PAGE below "Foreign Application priority Data" cancel "2214114"

and insert -- P.2214114.6 --;

Signed and sealed this 31st day of December 1974.

(SEAL)
Attest:

McCOY M. GIBSON JR.
Attesting Officer

C. MARSHALL DANN
Commissioner of Patents